(12) United States Patent
Kaizu

(10) Patent No.: US 7,992,012 B2
(45) Date of Patent: Aug. 2, 2011

(54) POWER SOURCE CONTROL CIRCUIT, POWER SOURCE CONTROL DEVICE, POWER SOURCE CONTROL SYSTEM, AND INFORMATION PROCESSING DEVICE

(75) Inventor: Tetsuya Kaizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 891 days.

(21) Appl. No.: 11/857,522

(22) Filed: Sep. 19, 2007

(65) Prior Publication Data

US 2008/0162959 A1     Jul. 3, 2008

(30) Foreign Application Priority Data

Dec. 28, 2006 (JP) ................................ 2006-355102

(51) Int. Cl.
*G06F 1/00* (2006.01)
*G06F 15/16* (2006.01)
(52) U.S. Cl. ......... 713/300; 713/310; 709/231; 709/253
(58) Field of Classification Search .................. 713/300, 713/310; 709/231, 253
See application file for complete search history.

(56) References Cited

U.S. PATENT DOCUMENTS

| 5,737,616 | A | 4/1998 | Watanabe | |
| 5,758,171 | A * | 5/1998 | Ramamurthy et al. | 713/300 |
| 6,968,467 | B2 * | 11/2005 | Inoue et al. | 713/320 |
| 2004/0039835 | A1 * | 2/2004 | Glenn et al. | 709/231 |
| 2005/0283627 | A1 * | 12/2005 | Diab et al. | 713/300 |
| 2008/0089253 | A1 * | 4/2008 | Goto et al. | 370/282 |

FOREIGN PATENT DOCUMENTS

| JP | 63-268426 A | 11/1988 |
| JP | 2-266409 | 10/1990 |
| JP | 5-153267 A | 6/1993 |
| JP | 8-23792 | 3/1996 |
| JP | 8-314587 A | 11/1996 |
| JP | 8-328699 A | 12/1996 |
| JP | 2001-84064 | 3/2001 |
| JP | 2003-271018 | 9/2003 |

OTHER PUBLICATIONS

Japanese Notice of Rejection, English-language Translation, mailed Apr. 5, 2011 for corresponding Japanese Application No. 2006-355102.

* cited by examiner

*Primary Examiner* — Vincent T Tran
(74) *Attorney, Agent, or Firm* — Fujitsu Patent Center

(57) ABSTRACT

In order to make it possible to reduce the time required for the central power source control unit to perform power source control of the power source unit of the expanded apparatus, the central power source control unit includes: a power source control information holding unit which holds power source control information written by a central processing circuit for performing power source controlling of another power source device; and a transmission control unit which transmits the power source control information held in the power source control information holding unit to another power source control circuit that performs power source control of said another power source device.

18 Claims, 9 Drawing Sheets

| | SIGNAL NAME | DIRECTION | THE NUMBER OF SIGNALS | FUNCTION |
|---|---|---|---|---|
| 1 | −Clock | CENTRAL APPARATUS → EXPANDED DEVICE | 1 | CLOCK SIGNAL |
| 2 | −Chip Select | CENTRAL APPARATUS → EXPANDED DEVICE | 1 | CHIP SELECT SIGNAL |
| 3 | +Read/−Write | CENTRAL APPARATUS → EXPANDED DEVICE | 1 | READ/WRITE SIGNAL |
| 4 | +DATA | CENTRAL APPARATUS ←→ EXPANDED DEVICE | 1 | DATA SIGNAL |

FIG. 4

| TRANSFER PHASE | NAME | DATA | DESCRIPTION |
|---|---|---|---|
| INITIATION OF TRANSFER | START COMMAND | 0x55 | INDICATE A COMMAND FOR INITIATING TRANSFER |
| | BLOCK ADDRESS UPPER | 8bit | INDICATE THE LEADING ADDRESS OF THE BLOCK FROM WHICH TRANSFER IS INITIATED. UPPER END. |
| | BLOCK ADDRESS LOWER | 8bit | INDICATE THE LEADING ADDRESS OF THE BLOCK FROM WHICH TRANSFER IS INITIATED. LOWER END. |
| | THE NUMBER OF BYTES TRANSMITTED | 8bit | INDICATE THE NUMBER OF BYTES TO BE TRANSMITTED. 0X08 FIXED. |
| COMPLETION OF TRANSFER | COMPLETION COMMAND | 0xAA | INDICATE COMPLETION COMMAND OF TRANSFER |
| | RESPONSE | 0x80 0x13 | INDICATE NORMAL RESPONSE<br>INDICATE ABNORMAL RESPONSE |
| | ERROR STATUS (STS:STATUS) | 8bit | EFFECTIVE AT THE TIME OF ABNORMAL RESPONSE<br>Bit4 —— COMMAND ERROR<br>Bit5 —— PARAMETER ERROR<br>Bit7(LSB) —— PARITY ERROR<br>ALL '0' AT THE TIME OF NORMAL RESPONSE |
| | INTERNAL-BLOCK ADDRESS (IBKAD: INTERNAL BLOCK ADDRESS) | 8bit | INDICATE ERROR OCCURRENCE POSITION (THE NUMBER OF TRANSFER) IN TRANSFER BLOCK<br>ALL "0" AT THE TIME OF NORMAL RESPONSE |
| | ERROR DATA (DT:Data) | 8bit | INDICATE DATA AT THE TIME OF OCCURRENCE OF ERROR.<br>ALL "0" AT THE TIME OF NORMAL RESPONSE |
| | ERROR DATA P DTP(DATA PARITY) | 8bit | INDICATE DATA PARITY AT THE TIME ERROR OCCURS.<br>ALL "0" AT THE TIME OF NORMAL RESPONSE |

POWER SOURCE CONTROL CIRCUIT, POWER SOURCE CONTROL DEVICE, POWER SOURCE CONTROL SYSTEM, AND INFORMATION PROCESSING DEVICE

BACKGROUND OF THE INVENTION

1) Field of the Invention

The present invention relates to technology for power source control of an expanded apparatus (subsidiary apparatus) connected to a central apparatus (main apparatus).

2) Description of the Related Art

In a previous power source control system 100, as shown in FIG. 9, for example, a central power source control unit 112 for performing power source control of power source units 111a through 111c of a central apparatus (main apparatus; for example, main server) 110 and expanded power source control units 122 for performing power source control of power source unit 121-1 through 121-n of multiple (n-number of; here, n is an integer greater than 1) expanded apparatus (subsidiary apparatus; for example, expanded server apparatus) 120-1 through 120-n connected to the central apparatus 110 are connected through buses 130. The central power source control unit 112 determines power source control content of the power source units 121-1 through 121-n of the expanded apparatus 120-1 through 120-n, and the power source control content is transmitted to the expanded power source control units 122 through the buses 130.

Further, the power source units 121-1 through 121-n are three power source units 121a through 121c.

Each of the power source units 111a through 111c supply electric power to, for example, the CPU (Central Processing Unit; not illustrated) or a storage device (not illustrated) of the central apparatus 110. In addition, the power source units 121a through 121c supply electric power to the CPU (Central Processing Unit; not illustrated) or a storage device (not illustrated) of the central apparatus 120.

The central power source control unit 112 includes: a computing unit [for example, MPU (Micro Processing Unit)] 113 which computes power source control information as the control content (for example, power ON or OFF) of the power source unit 111a through 111c and power source control information as the control content of the power source unit 121-1 through 121-n; a central power source control register 114 which holds power source control information of the power source units 111a through 111c and controls the power source units 111a through 111c on the basis of the power source control information; and a central side expanded power source control unit 115 including an interface control unit 115a which transmits power source control information of the power source unit 121-1 through 121-n computed by the computing unit 113 to the corresponding expanded power source control unit 122 through the bus 130.

In this instance, the central power source control register 114 has an output register 114a which holds power source control information for the power source units 111a through 111c computed by the computing unit 113 and a reading register 114b which holds power source information (for example, an alarm signal) from the power source units 111a through 111c.

The reading register 114b further includes: a direct reading register 114c which is a register that directly reads signal and holds power source information from the power source units 111a through 111c; a rising edge/falling edge flag register 114d which performs noise absorption sampling for each bit of the direct reading register 114c and holds the result of the detected rising edge/falling edge; an interrupt mask register 114e which sets whether or not an interrupt signal is to be transmitted to the computing unit 113 upon reception of power source information from the power source units 111a through 111c; a rising edge/falling edge detecting register 114f which sets at which of rising edge or falling edge, the presence or absence of an alarm signal from the power source units 111a through 111c is to be detected; a sampling cycle register 114g which holds detection cycle (for example, successive detection time of alarm signals which is required to decide that an alarm signal is detected) for absorbing noise of an alarm signal from the power source units 111a through 111c.

In this instance, rising edge/falling edge flag register 114d can be cleared by the computing unit 113, and sampling cycle for noise absorption is set by the sampling cycle register 114g, and further, effective/non-effective setting can be performed by the rising edge/falling edge detecting register 114f.

For example, when the sampling cycle set in the sampling cycle register 114g is 32 ms, and the rising detection register 114f is effective (falling edge detection register 114f is ineffective), and an alarm signal from the power source units 111a through 111c is positive (+), if the high level of an alarm signal successively appears not shorter than 32 ms, the rising edge flag register 114d turns ON, and an interrupt occurs in the computing unit 113.

After log collection, that is, after confirming an error factor, the computing unit 113 clears the rising edge flag register 114d, and makes the rising edge detecting register 114f ineffective, and makes the falling edge detecting register 114f effective.

If a predetermined time (32 ms) is elapsed after an alarm signal becomes low level, the falling edge flag register 114d turns ON, and an interruption occurs in the computing unit 113. The computing unit 113 confirms that an alarm is vanished, and clears the falling edge flag register 114d to make the falling detection register 114f ineffective, and makes the rising edge detecting register 114f effective to monitor an alarm.

In this instance, log (alarm details) collection by the computing unit 113 is realized by reading information in the direct reading register 114c and the rising edge/falling edge register 114d.

Further, the expanded power source control units 122 of each of the expanded apparatus 120-1 through 120-n includes: an interface control unit 123 which receives power source control information sent from the interface control unit 115a of the central power source control unit 112 via the bus 130; and an expanded power source control register 124 which performs power source control of the power source unit 121-1 through 121-n on the basis the power source control information received by the interface control unit 123.

In this instance, as in the case of the central power source control register 114, the expanded power source control register 124 also includes: an output register 124a and a reading register 124b (that is, direct reading register 124c, rising edge/falling edge flag register 124d, interrupt mask register 124e, rising edge/falling edge detecting register 124f, and sampling cycle register 124g) corresponding to the output register 114a and the reading register 114b (that is, direct reading register 114c, rising edge/falling edge flag register 114d, interrupt mask register 114e, rising edge/falling edge detecting register 114f, and sampling cycle register 114g), respectively.

Further, in FIG. 9, an output register 124a and a reading register 124b of the expanded power source control register 124 of the expanded apparatus 120-n are not illustrated for simplification of the drawing.

Here, the interface control unit 115a of the central power source control unit 112 and the interface control unit 123 of the expanded power source control unit 122 perform data transceiving therebetween with the parallel bus scheme (parallel transfer scheme). Accordingly, the bus 130 is a parallel bus composed of multiple signal lines.

Then, in the power source control system 100, the computing unit 113 computes power source control information for instructing ON/OFF of power source and writes it in the output register 114a of the central power source control register 114. As a result, power source of the central apparatus 110 is turned ON or OFF.

In this instance, the central power source control unit 112 performs power source control of the power source unit 111a through 111c under the state that the central apparatus 110 is powered off (that is the central apparatus 110 is not supplied with electric power from the electric power unit 111a through 111c). Regardless of the power state of the central apparatus 110, the central power source control unit 112 is an always powered-on control unit which is always operable with supply of electric power from the power source units 111a through 111c or another power source.

Turning ON or OFF of the expanded apparatus 120-1 is realized by the computing unit 113 which computes power source control information to the power source unit 121-1 and writes in an output register 124a of the corresponding expanded power source control register 124. That is, the central side expanded power source control unit 115 transmits such power source control information to the expanded power source control unit 122 of the expanded apparatus 120-1, and the expanded power source control unit 122 performs power source control of the power source unit 121-1 on the basis of such power source control information.

In this instance, as in the case of the central power source control unit 112, the expanded power source control unit 122 is supplied with power from power source units 121-1 through 121-n (hereinafter, power source units 121-1 through 121-n are simply indicated by the reference character 121 when they are not particularly distinguished thereamong) or from another power source, and thus, the power of the expanded power source control unit 122 is always ON, independently from the power source state of the expanded apparatus 120-1 through 120-n.

Power source state monitoring of the expanded apparatus 120-1 through 120-n is performed by the computing unit 113 which reads the output register 124a of the expanded power source control register 124 of the expanded apparatus 120-1 through 120-n through the interface control unit 123 and the interface control unit 115a (central side expanded power source control unit 115) through the bus 130, or by the expanded power source control unit 124 of the expanded apparatus 120-1 through 120-n which samples an alarm signal from the power source unit 121-1 through 121-n with the reading register 124b, and sends an interrupt (in the drawing, described as "the control signal (interrupt)" and "an interrupt signal") to the computing unit 113 (in the drawing, see arrow 131-1, 131-n, and 116).

Upon receipt of an interrupt signal from the expanded power source control unit 122, the computing unit 113 reads alarm details from the power source unit 121 held in the direct reading register 124c in the reading register 124b of the expanded power source control register 124 of the expanded power source control unit 122 by way of the bus 130, thereby understanding power source state of the expanded apparatus 120-1 through 120-n.

In the parallel bus scheme, an address path and a data path are common. After an address is set with an address strove signal, data is transmitted. The bus 130 is composed of multiple signal lines for transceiving eight bits and one parity bit, and eight signal lines (see arrow 131-1, 131-n, 132-1, 132-n) for other control signals (interrupt signal, read/write signal, address strove signal, DATA-ACKNOWLEDGE signal, etc.).

Further, the interface control unit 115a and each interface control unit 123 control bus timing of the bus 130.

In this instance, in a previous art, a controller (power source control device) for controlling power source and at least one power source are used for transmitting power source control information (signal) with serial line communication (serial data bus scheme) (see the following patent documents 1 and 2). In another previous art, power source control of an expanded box connected to a personal computer through a docking base and power source control of such docking base are performed by the CPU of the personal computer on the basis of a processing routine for performing power source control held in a BIOS-ROM (Basic Input/Output System-Read Only Memory) (see the following patent document 3).

Here, according to the power source control system 100 of FIG. 9, in access from the computing unit 113 to the output register 124a of the expanded power source control register 124 of the expanded power source control unit 122, when the interface control unit 123 of the expanded power source control unit 122 receives power source control information sent from the computing unit 113, it returns DATA-ACKNOWLEDGE signal (in the drawing, described as "ACK signal", and the computing unit 113 receives this DATA-ACKNOWLEDGE signal, the access being thereby completed (see arrow 117). Accordingly, the access from the computing unit 113 to the output register 124a of the expanded power source control register 124 of the expanded power source control unit 122 is performed by way of the bus 130, and the DATA-ACKNOWLEDGE signal needs to be received by way of the bus 130, so that access time is increased.

Further, once the computing unit 113 starts accessing to the output register 124a via the central side expanded power source control unit 115, it cannot perform any other processing until the access is completed by reception of a DATA-ACKNOWLEDGE signal from the expanded power source control unit 122. Thus, longer access time results in lower processing speed of the computing unit 113.

Likewise, in access from the computing unit 113 to the reading register 124b of the expanded power source control register 124 of the expanded power source control unit 122, data need to be transceived by way of the bus 130, resulting in longer access time.

That is, the reading register 124b of the expanded power source control register 124 on the expanded apparatus 120-1 side has a setting function for alarm monitoring [that is, interrupt mask register 124e, rising edge/falling edge detecting register 124f, sampling cycle (monitoring time setting; sampling adjusting) register 124f] and an alarm monitoring function. Thus, when an alarm occurs in the power source units 121-1 through 121-n, it is necessary for the computing unit 113 to access the reading register 124b of the expanded power source control register 124 on the expanded apparatus 120-1 through 120-n, so that time required for collecting a log or the like relating to an alarm is lengthened.

During such access being performed, the computing unit 113 cannot perform any other processing, so that longer access time to the reading register 124b causes the processing speed of the computing unit 113 reduced.

Further, in the previous power source control system 100, since the central power source control unit 112 and the expanded power source control unit 122 are connected by a parallel bus interface. Thus, the number of signal lines of the bus 130 is large. A larger number of expanded devices 120-1 through 120-n cause a significantly large number of signal lines of the bus 130, so that it becomes complicated to manage and organize signal lines between the central power source control unit 112 and the expanded power source control unit 122.

[Patent document 1] Japanese Patent Laid-open No. 2003-271018

[Patent document 2] Japanese Patent Public Notification No. HEI 8-23792

[Patent document 3] Japanese Patent Laid-open No. 2001-84064

SUMMARY OF THE INVENTION

With the foregoing problems in view, one object of the present invention is to make it possible to reduce time required for the central power source control unit to perform power source control of the power source unit of the expanded apparatus. Another object of the invention is to reduce the number of signal lines connecting between the central power source control unit and the expanded power source control unit.

In order to accomplish the above object, according to the present invention, there is provided a power source control circuit, comprising: a power source control information holding unit which holds power source control information written by a central processing circuit for performing power source controlling of another power source device; and a transmission control unit which transmits the power source control information held in the power source control information holding unit to another power source control circuit that performs power source control of said another power source device.

As a preferred feature, the power source control circuit further comprises: a reception control unit which receives power source information relating to said another power source device from said another power source control circuit; and a power source information holding unit which holds the power source information received by the reception control unit.

As a generic feature, there is provided a power source control circuit, comprising: a reception control unit which receives power source control information for power source control of a power source device, which information is held in a central power source control circuit, from the central power source control circuit; and a power source control information holding unit which holds the power source control information received by the reception control unit.

As a preferred feature, the power source control circuit further comprises: a power source information holding unit which holds power source information relating to the power source device; and a transmission control unit which transmits the power source information held in the power source information holding unit to the central power source control circuit.

As another generic feature, there is provided a power source control device, comprising: a computing unit which computes first power source control information for performing power source control of a first power source device of another device connected to a central device; a first power source control information holding unit which holds the first power source control information computed by the computing unit; and a transmission control unit which transmits the first power source control information held in the first power source control information holding unit to said another device.

As yet another generic feature, there is provided a power source control system, comprising: an expanded power source control device which performs power source control of a first power source device that supplies electric power to another device connected to a central device; and a central power source control device, including: a computing unit which computes first power source control information for performing power source controlling of the first power source device; a first power source control information holding unit which holds the first power source control information computed by the computing unit; and a first transmission control unit which transmits the first power source control information held in the first power source control information holding unit to the expanded power source control device.

As a preferred feature, the expended power source control device includes: a first reception control unit which receives the first power source control information transmitted from the first transmission control unit; and a second power source control information holding unit which holds the first power source control information received by the first reception control unit.

As another preferred feature, the first transmission control unit sequentially transmits the first power source control information to the first reception control unit using at least one signal line.

As yet another preferred feature, the expanded power source control unit includes: a first power source information holding unit which holds power source information relating to the first power source device transmitted from the first power source device; and a second transmission control unit which transmits the power source information held in the first power source information holding unit to the central power source control device.

As a further preferred feature, the central power source control device includes: a second reception control unit which receives the power source information transmitted from the second transmission control unit; and a second power source information holding unit which holds the power source information received by the second reception control unit.

As another generic feature, there is provided an information processing apparatus whose power source is controlled by a power source control apparatus, the power source control apparatus comprising: a computing unit which computes first power source control information for performing power source control of a first power source device of another device connected to a central device; a first power source control information holding unit which holds the first power source control information computed by the computing unit; and a transmission control unit which transmits the first power source control information held in the first power source control information holding unit to said another device.

In this manner, according to the present invention, the central power source control device includes: a first power source control information holding unit which holds first power source control information (power source control information of other power source devices) of the first power source device computed by the computing unit (central processing circuit); and the first transmission control unit (transmission control unit) which transmits the first power source control information held in the first power source control information holding unit to an expanded power source control device (another power source control circuit). Thus, the computing unit no longer is necessary to write the first power source control information to the expanded power source control device by way of the bus, as described above in the prior art, so that write processing of the first power source control information for performing power source control of the first power source device can be performed in a significantly short time. As a result, the processing performance of the computing unit is improved.

Further, the central power source control device includes: the second reception control unit (reception control unit) which receives power source information of the first power source device from the expanded power source control device; and the second power source information holding unit (power source information holding unit) which holds power source information received by the second reception control unit. Thus, the computing unit is no longer necessary to read power source information of the first power source device, as in the previous art, from the expanded power source control device by way of the bus. Hence, reading processing of the power source information can be performed in a significantly short time, so that the processing performance of the computing unit is improved.

Furthermore, the expanded power source control device includes: the first reception control unit (reception control unit) which receives the first power source control information from the central power source control device (central power source control circuit); and the second power source control information holding unit (power source control information holding unit) which holds the first power source control information received by the first reception control unit. Thus, on the basis of the first power source control information computed by the computing unit, it is possible to perform power source control of the first power source device with reliability.

Here, the expanded power source control device includes: the first power source information holding unit which hold power source information of the first power source device; and the second transmission control unit (transmission control unit) which transmits the power source information held in the first power source information holding unit to the central power source control device. Thus, it is possible to transmit power source information or the like at the time when abnormality occurs in the first power source device to the computing unit with reliability. As a result, power source information from the first power source device can be reflected to power source control of the first power source device with reliability.

Further, the first transmission control unit sequentially transmits the first power source control information to the expanded power source control device (the first reception control unit) through at least one signal line. In comparison with the previous art, in which data is transmitted with the parallel data bus scheme, the present invention can significantly reduce the number of signal lines.

Other objects and further features of the present invention will be apparent from the following detailed description when read in conjunction with the accompanying drawings.

BRIEF DESCRIPTION OF THE DRAWINGS

FIG. 2(a) is a diagram for describing a signal line forming a serial bus; FIG. 2(b) is a table for describing a signal transmitted over each signal line shown in FIG. 2(a);

FIG. 4 is a table for describing a signal transceived by a data signal line which is a serial bus of the power source control system according to one preferred embodiment of the present invention;

DESCRIPTION OF THE PREFERRED EMBODIMENT(S)

Referring to the relevant drawings, a description will be made hereinbelow of one preferred embodiment of the preset invention.

[1] One Preferred Embodiment

Figure 1:
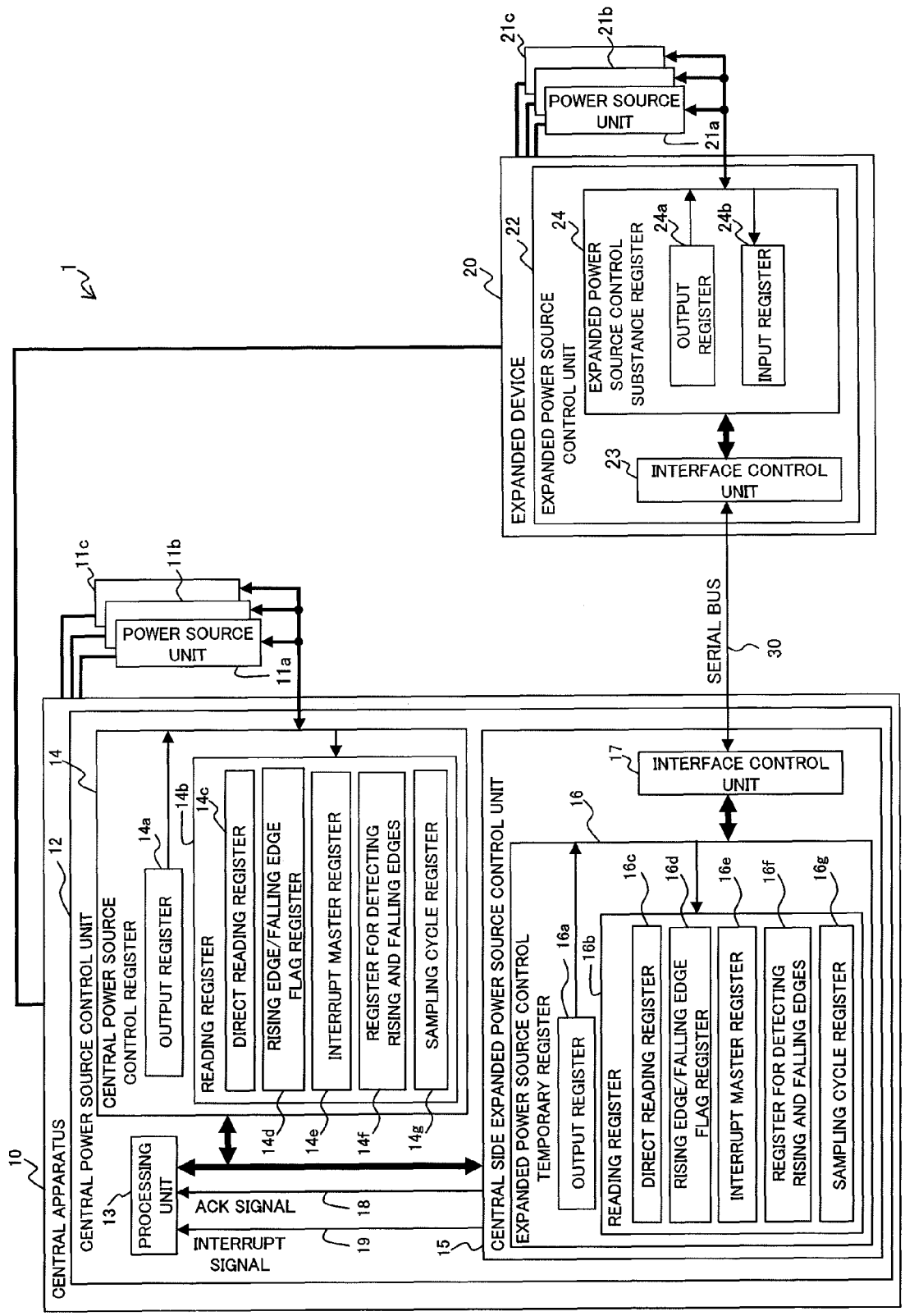
FIG. 1 is a block diagram showing a construction of a power source control system according to one preferred embodiment of the present invention.

First of all, referring to the block diagram of FIG. 1, a description will be made of a construction of a power source control system 1. As shown in FIG. 1, the power source control system 1 includes: a central power source control unit (power source control device; central power source control device) 12 which performs power source control of power source units (power source device; second power source device) 11a through 11c which supply electric power to a central apparatus (information processing device; for example, main server) 10 as a main apparatus; an expanded power source control unit (expanded power source control device; another power source control circuit) 22 which performs power source control of power source units (another power source unit; a first power source device) 21a through 21c that supplies electric power to an expanded device (another device; information processing device, for example, an expanded server) 20 which serves as a subsidiary device connected to the central apparatus 10; and a serial bus 30 (will be detailed later with reference to FIG. 2) connecting between the central power source control unit 12 and the expanded power source control unit 22.

In this instance, the power source units 11a through 11c (hereinafter simply indicated by reference character 11 when they are not distinguished thereamong) supply electric power to a CPU (Central Processing Unit; not illustrated) and a storage device (not illustrated) of the central apparatus 10. The central power source control unit 12 controls each of the power source units 11, thereby controlling ON/OFF of the power source of the central apparatus 10.

Accordingly, the central power source control unit 12 can always be operable (that is, as a control unit for a full-time power source) as a unit which receives electric power from the power source unit 11 or another power source (not illustrated) in order to perform power source control of the power source unit 11 regardless of the power source state of the central apparatus 10.

On the other hand, the power source units 21a through 21c (hereinafter will be simply indicated by reference character 21 when they are not distinguished thereamong), supply electric power to a CPU (not illustrated) and a storage device (not illustrated) of the expanded device 20. The expanded power source control unit 22 controls each of the power source units 21 upon receiving instruction from the central power source control unit 12, thereby controlling ON/OFF of power of the expanded device 20.

Hence, like the central power source control unit 12, the expanded power source control unit 22 is supplied with electric power from the power source unit 21 or another power source (not illustrated) so that it is always operable to perform power source control of the power source unit 21 regardless of the power source state of the expanded device 20.

The central power source control unit 12 includes: an computing unit [central processing circuit; for example, MPU (Micro Processing Unit)] 13; a central power source control register 14, and a central-side expanded power source control unit (power source control circuit; central power source control circuit) 15.

The computing unit 13 computes power source control information (second power source control information) as the content (for example, ON/OFF of power) of control of the power source unit 11 connected to the central apparatus 10, and also computes power source control information (first power source control information) as the content of control of the power source unit 21 connected to the expanded device 20. Further, the computing unit 13 writes the computed power source control information of the power source unit 11 to the central power source control register 14 (more precisely, an output register 14a which will be described later), and also writes the computed power source control information of the power source unit 21 to an expanded power source control temporary register 16 (will be describe later; more precisely, an output register 16a which will be described later) of the central side expanded power source control unit 15.

Further, when the computing unit 13 receives an interrupt signal relating to an alarm signal, which is output from the power source unit 11, from the central power source control register 14, the computing unit 13 computes power source control information of the power source unit 11 on the basis of the content of the alarm signal.

Furthermore, when the computing unit 13 receives an interrupt signal relating to an alarm signal, which is output from the power source unit 21, from the central side expanded power source control unit 15, the computing unit 13 computes power source control content of the power source unit 21 on the basis of the content of the alarm signal.

The central power source control register 14 includes: an output register (second power source control information holding unit; third power source control information holding unit) 14a; and a reading register (second power source information holding unit) 14b. The central power source control register 14 performs power source control of a power source unit 11 on the basis of the power source control information held in the output register 14a, and also, when receiving an alarm signal from the power source unit 11, the central power source control register 14 stores the alarm signal in the reading register 14b, and outputs an interrupt signal to the computing unit 13.

In this instance, both the output register 14a and the reading register 14b have multiple blocks for holding a multiple pieces of information. The output register 14a can simultaneously hold all the power source control information of the power source units 11a through 11c; the reading register 14b can hold all the alarm signals of the power source units 11a through 11c.

Then, the reading register 14b of the central power source control register 14 includes: a direct reading register 14c, a rising edge/falling edge flag register 14d; an interrupt mask register 14e; a rising edge/falling edge detecting register 14f; and a sampling cycle register 14g.

Figure 9:
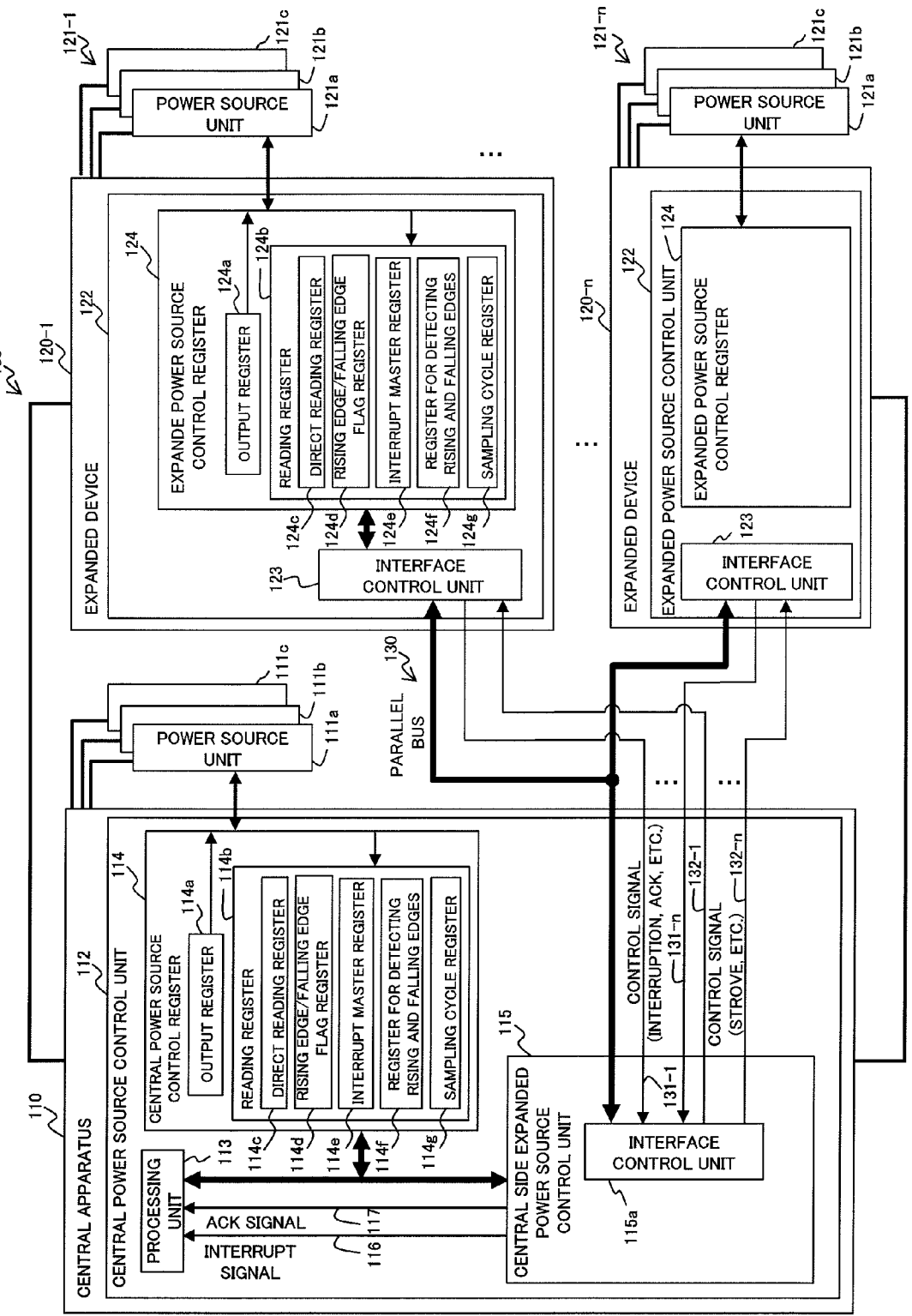
FIG. 9 is a block diagram showing a construction of a previous power source control system.

Here, the direct reading register 14c, the rising edge/falling edge flag register 14d, the interrupt mask register 14e, the rising edge/falling edge detecting register 14f, and the sampling cycle register 14g, of the reading register 14b, are the same as the reading register 114c, the rising edge/falling edge flag register 114d, the interrupt mask register 114e, the rising edge/falling edge detecting register 114f, and the sampling cycle register 114g, of the central power source control register 114 of the previous central power source control unit 112 as described with reference to FIG. 9.

That is, the direct reading register 14c holds an alarm signal (second power source information; hereinafter will be called the "alarm information") from the power source unit 11. The rising edge/falling edge flag register 14d performs sampling of noise absorption for each bit of the direct reading register 14c and holds therein the result of the rising edge/falling edge detected. The interrupt mask register 14e is a register for setting whether or not an interrupt signal should be output to the computing unit 13 at the time of reception of an alarm signal. The rising edge/falling edge detecting register 14f and the sampling cycle register 14g are registers for detecting and setting an alarm signal from the power source unit 11.

In this instance, the rising edge/falling edge flag register 14d is cleared by the computing unit 13, and sampling cycle for noise absorption is set by the sampling cycle register 14g, and is set as to whether or not it is effective by the rising edge/falling edge detecting register 14f.

For example, when the sampling cycle set in the sampling cycle register 14g is 32 ms, and when the rising edge detecting register 14f is effective (the falling edge detecting register 14f is ineffective), if an alarm signal from the power source unit 11 is positive (+), assuming that the high level of the alarm signal keeps occurring for 32 ms or longer successively, the rising edge flag register 14d is turned ON, and an interruption occurs in the computing unit 13.

After collecting a log(that is, after confirming an error factor), the computing unit 13 clears the rising edge flag register 14d, and makes the rising edge detecting register 14f ineffective, and makes the falling edge detecting register 14f effective.

Then, the alarm signal becomes and keeps low level for a predetermined successive time duration (32 ms), the falling edge flag register 14d becomes ON, and an interruption occurs in the computing unit 13. The computing unit 13 confirms that an alarm is vanished, and clears the falling edge flag register 14d, and makes the falling edge detecting register 14f ineffective, and makes the rising edge detecting register 14f effective for alarm monitoring.

In this instance, collection of a log(alarm details) by the computing unit 13 is realized by reading information in the direct reading register 14c and the rising edge/falling edge flag register 14d.

To control the power source unit 21 on the basis of power source control information of the power source unit 21 computed by the computing unit 13, the central side expanded power source control unit 15 once and temporarily holds the power source control information before sending it to the expanded power source control unit 22. Here, when power source control information is written by the computing unit 13 thereto, the central side expanded power source control unit 15 sends a DATA-ACKNOWLEDGE signal (in the drawing, described as an "ACK signal") to the computing unit 13 (see arrow 18).

Further, when receiving an alarm signal (first power source information; alarm information) of the power source unit 21 from the expanded power source control unit 22, the central side expanded power source control unit 15 temporarily holds the alarm information, and outputs an interrupt signal to the computing unit 13 (see arrow 19).

More specifically, the central side expanded power source control unit 15 has an expanded power source control temporary register 16 and an interface control unit (transmission control unit; reception control unit; first transmission control unit; second reception control unit) 17.

The expanded power source control temporary register 16 has the same or approximately the same construction as that of the expanded power source control register 124 which is provided for the expanded power source control unit 122 of the previous power source control system 100 of FIG. 9. The expanded power source control temporary register 16 includes: an output register (power source control information holding unit; a first power source control information holding unit) 16a; and a reading register (power source information holding unit; second power source information holding unit) 16b which holds alarm information of an alarm signal of the power source unit 21, which information is received from the expanded power source control unit 22 through a serial bus.

In this instance, both the output register 16a and the reading register 16b have multiple blocks for holding multiple pieces of information. The output register 16a can simultaneously hold all the power source control information of the power source units 21a through 21c; the reading register 16b can hold all the alarm signals of the power source unit 21a through 21c.

In addition, the reading register 16b includes: a direct reading register 16c; a rising edge/falling edge flag register 16d; an interrupt mask register 16e; a rising edge/falling edge detecting register 16f; and a sampling cycle register 16g.

In this instance, the direct reading register 16c, the rising edge/falling edge flag register 16d, the interrupt mask register 16e, the rising edge/falling edge detecting register 16f, and sampling cycle register 16g, of the reading register 16b are the same or approximately the same as the direct reading register 124c, the rising edge/falling edge flag register 124d, the interrupt mask register 124e, the rising edge/falling edge detecting register 124f, and the sampling cycle register 124g, respectively, of the expanded power source control register 124 of the previous expanded power source control unit 122 as shown in FIG. 9.

That is, the direct reading register 16c holds an alarm signal from the power source unit 21, received from the expanded power source control unit 22. The rising edge/falling edge flag register 16d performs noise absorption sampling for each bit of the direct reading register 16c, and holds the result of rising edge and falling edge detected. The interrupt mask register 16e is a register for setting whether or not an interrupt signal is to be output to the computing unit 13 at the time of reception of the alarm signal. The rising edge/falling edge detecting register 16f and the sampling cycle register 16g are registers for detecting and setting an alarm signal from the power source unit 21.

The interface control unit 17 regularly performs data transceiving with the expanded power source control unit 22 through the serial bus 30 with a serial bus scheme (serial transfer scheme), independently from the computation of the computing unit 13. The interface control unit 17 not only functions as a transmission control unit (first transmission control unit) which transmits power source control information held in the output register 16a to the expanded power source control unit 22 but also functions as a reception controlling unit (second reception controlling unit) which receives alarm information of the power source unit 21 transmitted from the expanded power source control unit 22.

In this instance, data transfer using a serial data bus scheme between the interface control unit 17 and the interface control unit 23 of the expanded power source control unit 22 (which will be detailed later) will be detailed later with reference to FIG. 2.

The expanded power source control unit 22 includes an interface control unit 23 and the expanded power source control substance register 24.

The interface control unit 23 regularly performs data transceiving with the interface control unit 17 of the central side expanded power source control unit 15 through the serial bus 30, individually from processing of the computing unit 13. The interface control unit 23 not only functions as a reception control unit (first reception control unit) which receives power source control information which is transmitted from the interface control unit 17 and temporarily held in the output register 16a, but also functions as a transmission control unit (second transmission control unit) which transmits alarm information of the power source unit 21, received from the power source unit 21, to the interface control unit 17.

The expanded power source control substance register 24 performs power source control of the power source unit 21 based on power source control information of the power source unit 21 computed by the computing unit 13, and includes an output register 24a and an input register 24b.

The output register 24a holds power source control information received by the interface control unit 23 from the interface control unit 17. The expanded power source control substance register 24 performs power source control of the power source unit 21 by means of power source control information being written in the output register 24a.

The input register 24b holds alarm information transmitted from the power source unit 21; the interface control unit 17 transmits alarm information of the power source unit 21 held in the input register 24b to the interface control unit 17.

In this manner, in the present power source control system 1, the central power source control unit 12 has an expanded power source control temporary register (hereinafter will be called the "temporary register") 16 which temporarily holds power source control information of the power source unit 21 of the expanded device 20, and the computing unit 13 writes power source control information of the power source unit 21 to the temporary register 16. When DATA-ACKNOWLEDGE signal is received from the central side expanded power source control unit 15, the computing unit 13 finishes power control processing for the power source unit 21 and moves to another processing. That is, since power source control information need not to be written in the expanded power source control unit 22 on the expanded device 20, as already described in the previous art, the processing time can be significantly reduced and the processing speed is increased.

Further, since the interface control unit 17 transmits power source control information held in the output register 16a to the expanded power source control unit 22 individually from the processing of the computing unit 13, power source control of the power source unit 21 is surely performed by the expanded power source control unit 22.

On the other hand, alarm information transmitted from the power source unit 21 of the expanded device 20 and held in the input register 24b of the expanded power source control substance register 24 is transmitted from the interface control unit 23 to the interface control unit 17. This alarm information is held in the reading register 16b of the temporary register 16 (more precisely, direct reading register 16c), and thus, the computing unit 13 can read out alarm information from the reading register 16b when an interrupt signal is received from the central side expanded power source control unit 15. Thus, in comparison with a case where alarm information is read from the expanded power source control unit 22 as described above in the previous art, the processing time is significantly reduced and the processing performance of the computing unit 13 is greatly improved.

Here, referring to FIG. 2(a) and FIG. 2(b), a description will be made hereinbelow of a data transfer method with a serial data bus scheme by the serial bus 30 and the interface control units 17 and 23.

Figures 2A, 2B:
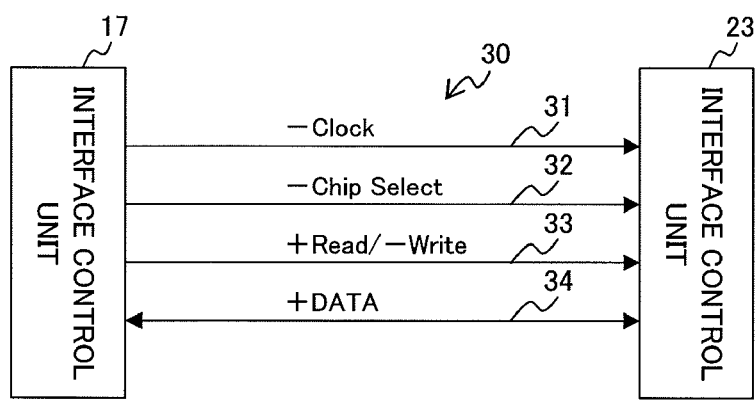
FIG. 2(a) and FIG. 2(b) are diagrams for describing a serial bus in the power source control system of one preferred embodiment of the present invention.

As shown in FIG. 2(a) and FIG. 2(b), the serial bus 30 is composed of four signal lines 31 through 34. The clock signal line 31 is for transmitting a clock signal (described as "–Clock" in the drawing) from the interface control unit 17 (central power source control unit 12) to the interface control unit 23 (expanded power source control unit 22). The chip select signal line 32 is for transmitting a chip select signal (described as "Chip Select" in the drawing) from the interface control unit 17 to the interface control unit 23. The read/write signal line 33 is for transmitting a read/write signal (described as "+Read/–Write" in the drawing) from the interface control unit 17 to the interface control unit 23. The data signal line 34 is for transeiving data (described as "+DATA" in the drawing) between the interface control units 17 and 23.

In other words, the serial bus scheme uses four signals: a clock signal; a chip select signal; a read/write signal; and data.

Then, the interface control units 17 and 23 uses one data signal line 34 to successively and sequentially transmit power source control information or alarm information as sequential data. Hereby, in comparison with the previous art as described in FIG. 9, the number of signal lines is significantly reduced.

In addition, in data transceiving between the interface control unit 17 and the interface control unit 23, the interface control unit 17 has a leadership, and controls switching between transmission and reception of data.

More precisely, data transmission is initiated by a transfer start command from the interface control unit 17. After data transfer completion, when the interface control unit 23 receives a completion command from the interface control unit 17, the interface control unit 23 returns response data to the interface control unit 17, and transmission is then completed.

Figure 3:
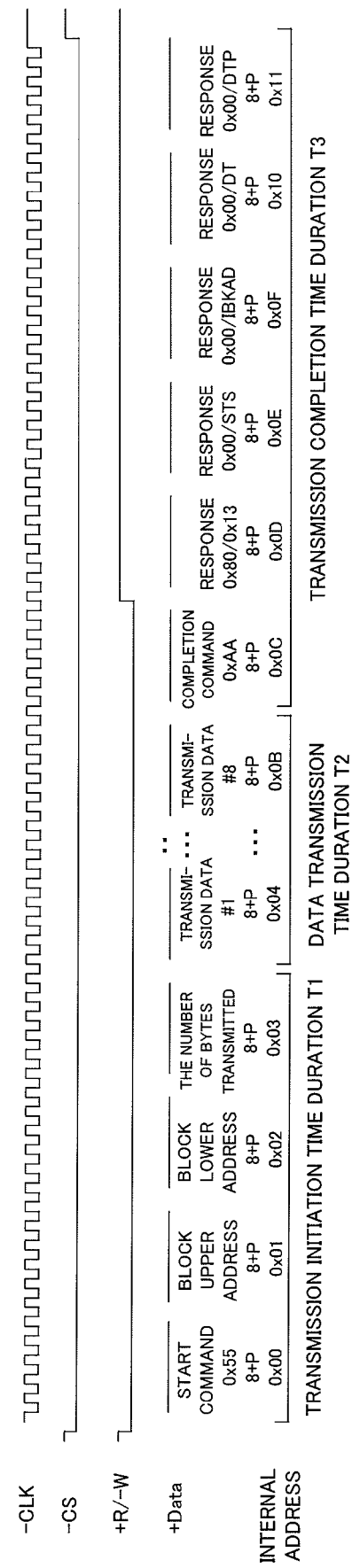
FIG. 3 is a timing chart for describing a signal over serial bus at the time of data transmission from a central power source control unit of a central apparatus of the power source control system according to one preferred embodiment of the present invention to an expanded power source control unit of an expanded device.

For example, as shown in FIG. 3, when data is transmitted from the interface control unit 17 of the central power source control unit 12 to the interface control unit 23 of the expanded power source control unit 22 (that is, power source control information held in the output register 16a is written in the output register 24a), the interface control unit 17 applies a clock signal to the clock signal line 31 at transfer initiation time duration T1, and turns ON (asserts) the chip select signal which selects the output register 24a transmitted over the chip select signal line 32, and turns the read/write signal transmitted by the read/write signal line 33 to "write". Then, the interface control unit 17 sequentially transmits, to the interface control unit 23, the start command "0x55", the block upper address, the block lower address, and the number of transfer bites, over the data signal 34.

In this instance, data transfer over the serial bus 30 (data signal line 34) between the interface control units 17 and 23 is performed by the unit of 9 bits (described as "8+P" in the drawing) which is composed of 8 bits of data and 1 bit of parity bit, through the transmission initiation time duration T1, the data transmission time duration T2, and the transmission completion time duration T3. In addition, internal block address ("0x00", "0x01", "0x02", "0x03", "0x04", "0x0B", "0x0C", "0x0D", "0x0E", "0x0F", "0x10", "0x11") in FIG. 3 and FIG. 5 (will be described later) are addresses for showing transfer blocks managed by, for example the interface control unit 17.

Here, in FIG. 4, an example of command format in the serial bus transfer method is shown. As shown in FIG. 4, the start command "0x55" at time T1 of initiation of transfer is a command for initiating transfer.

The block upper address (described as "block address upper" in FIG. 4) indicates a part of a leading address of a block (that is, transfer block) to which power source control information is to be written in the output register 24a of the expanded power source control substance register 24. The block lower address (described as "block address lower" in FIG. 4) also indicates a part of a leading address of a block of the output register 24a to which power source control information is written in the same manner.

That is, the interface control unit 17 uses the block upper address and the block lower address (that is, information of 2 bites), in order to specify the block (that is, transfer block) of the output register 24a to which power source control information held in the output register 16a is to be written, by means of specifying by the leading address of the block.

For example, if the leading address of the transfer block is "0x0100", the interface control unit 17 transmits "0x00" as a block upper address and "0x01" as a block lower address.

Further, the number of transmission bites indicates the number of bites of power source control information to be transmitted, and is, here, fixed to "0x08".

Next, in data transfer time duration T2, the interface control unit 17 transmits the power source control information held in the output register 16a as transmission data to the interface control unit 23 through the data signal line 34, while maintaining the chip select signal of the chip select signal line 32 to assert, and maintaining the read/write signal of the read/write signal line 33 to write.

After completion of data transfer, during transfer completion time duration T3, the interface control unit 17 maintains the chip select signal over the chip select signal line 32 to assert, and read/write signal of the read/write signal line 33 to write, and returns a completion command "0xAA" to the interface control unit 23 over the data signal line 34.

After completion of command transmission, the interface control unit 17 changes read/write signal over the read/write signal line 33 so as to indicate "read", and the interface control unit 23 sequentially transmits, as a response to the interface control unit 17, a normal/abnormal indicating response (in FIG. 3, described as "0x80/0x13"), an error status [in FIG. 3, described as "0x00/STS" (STS: Status)], an internal block address [in FIG. 3, described as "0x00/IBKAD" (IBKAD: Internal Block Address)], error data [in FIG. 3, described as "0x00/DT" (DT: Data)], and an error data parity [in FIG. 3, described as "0x00/DTP" (DTP: Data Parity)], thereby completing data transfer processing from the interface control unit 17 to the interface control unit 23.

In this instance, as shown in FIG. 4, the completion command "0xAA" during the transfer completion time duration T3 is a command for completing transfer. "0x80" in a response indicating normal/abnormal indicates a normal response, and "0x13" indicates an abnormal response.

Further, the error status is effective at time of abnormal response. For example, Bit 4 indicates a command error; Bit 5 indicates an parameter error; Bit 7 (LSB) indicates parity error. Here, at the time of normal response, all the values of error status becomes "0".

Further, the internal block address indicates the position of error occurrence in transmission block, and exhibit "0" at the time of normal response.

In this instance, error data indicates data when an error occurs, and all the error data at the time of normal response becomes "0".

Further, an error data parity indicates a data parity when an error occurs, and all the data parities at the time of normal response are "0".

Next, referring to FIG. 5, a description will be made of as to when data is transmitted from the interface control unit 23 of the expanded power source control unit 22 to the interface control unit 17 of the central power source control unit 12 (that is, when alarm information of the power source unit 21 held in the input register 24b is written in the direct reading register 16c of the reading register 16b). During the transfer initialization time duration T4, first of all, the interface control unit 17 applies a clock signal to the clock signal line 31, and turns ON (assert) a chip select signal which selects output register 24a transmitted by the chip select signal 32, and makes the read/write signal transmitted from the read/write signal line 33 to write. Here, during all the duration relating to data transfer, the clock signal is applied, and the chip select signal is turned ON.

Then, the interface control unit 17 transmits a start command "0x55" to the interface control unit 23 over the data signal line 34, and sequentially transmits a block upper address and a block lower address of the block in which alarm information of the power source unit 21 of the input register 24b of the expanded power source control substance register 24 is held, and the number of transfer bites.

That is, as described above, data transfer between the central side expanded power source control unit 15 and the expanded power source control unit 22 is controlled by the interface control unit 17. When data (power source control information) is transmitted from the central side expanded power source control unit 15 to the expanded power source control unit 22, the interface control unit 17 transmits block upper/lower address as a leading address to the interface control unit 23 (see transmission initiation time duration T1 of FIG. 3) in order to specify the address of block to which the data in the output register 24a of the expanded power source control substance register 24 is written.

On the other hand, when data (alarm information of the power source unit 21) is transmitted from the expanded power source control unit 22 to the central side expanded power source control unit 15, the interface control unit 17 transmits block upper/lower address as a leading address to the interface control unit 23 (see transfer initiation time duration T4), in order to specify the address of a block in which the alarm information of the input register 24b of the expanded power source control substance register 24.

In this instance, the interface control unit 17 specifies addresses of all the blocks of the output register 24a of the expanded power source control substance register 24 and addresses of all the blocks of the input register 24b sequentially (for example, alternately), thereby regularly performing writing processing of power control information held in the output register 16a to the output register 24a and performing reading processing of alarm information held in the input register 24b to the direct reading register 16c. Here, since both the output register 24a and the input register 24b have multiple blocks, the interface control unit 17 sequentially specifies the leading address by block upper/lower addresses, in order that processing to all the blocks are cyclically performed.

In other words, in order to regularly update the content of the expanded power source control temporary register 16 and the content of the expanded power source control substance register, the interface control unit 17 sequentially specifies addresses of all the blocks of the output register 24a and input register 24b by block upper/lower addresses.

In this instance, the interface control unit 17, for example, performs data transfer processing based on a cycle timer (not illustrated) and performs switching of block upper/lower addresses.

Figure 5:
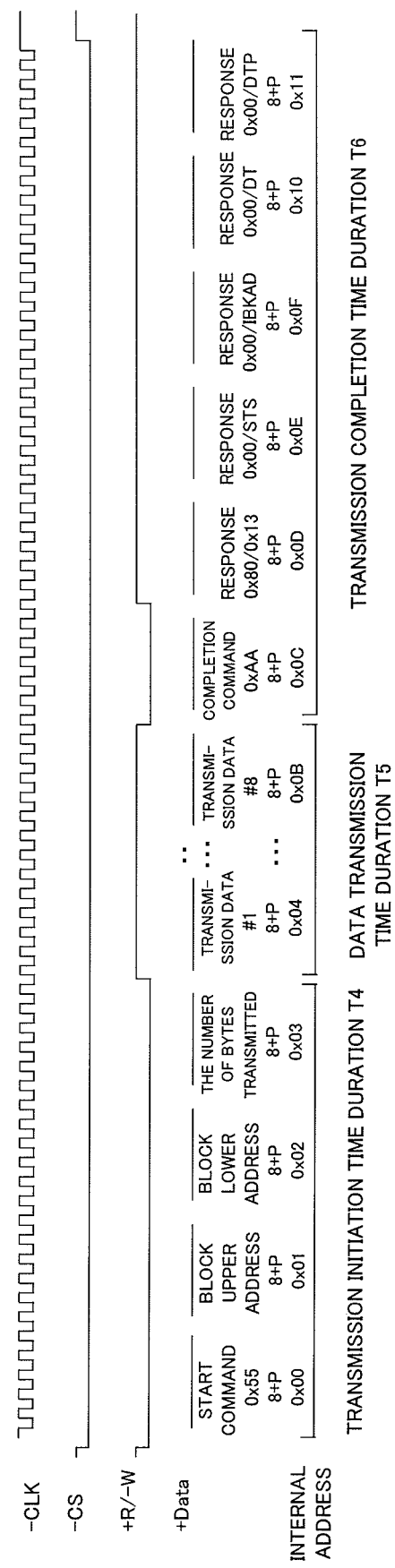
FIG. 5 is a timing chart for describing a signal over serial bus at the time of data transmission from an expanded power source control unit of an expanded device of the power control system according to one preferred embodiment of the present invention to a central power source control unit of a central apparatus of the power control system.

Then, as described in FIG. 5, during data transfer time period T5, the interface control unit 17 changes the read/write signal over the read/write signal 33 to "read", and receives alarm information as transfer data through the interface control unit 23 over the data signal line 34.

After completion of reception of the alarm signal, during the transfer completion time duration T6, the interface control unit 17 changes the read/write signal over the read/write signal line 33 to "write", and transmits the completion command "0xAA" to the interface control unit 23 over the data signal line 34.

After that, the interface control unit 17 changes the read/write signal of the read/write signal line 33 to "read". The interface control unit 23 sequentially transmits, to the interface control unit 17 as a response, a response indicating normality/abnormality (in the drawing, described as "0x80/0x13"), an error status (in the drawing, described as "0x00/STS), an internal block address (in the drawing, described as "0x00/IBKAD"), error data (in the drawing, described as "0x00/DT"), and an error data parity (in the drawing, described as "0x00/DTP), thereby completing data transfer processing from the interface control unit 23 to the interface control unit 17.

In this manner, the interface control units 17 and 23 function as an update control unit which regularly updates the content of the expanded power source control temporary register 16 and the content of the expanded power source control substance register 24, independently from the processing of the computing unit 13, using the serial bus 30.

Figure 6:
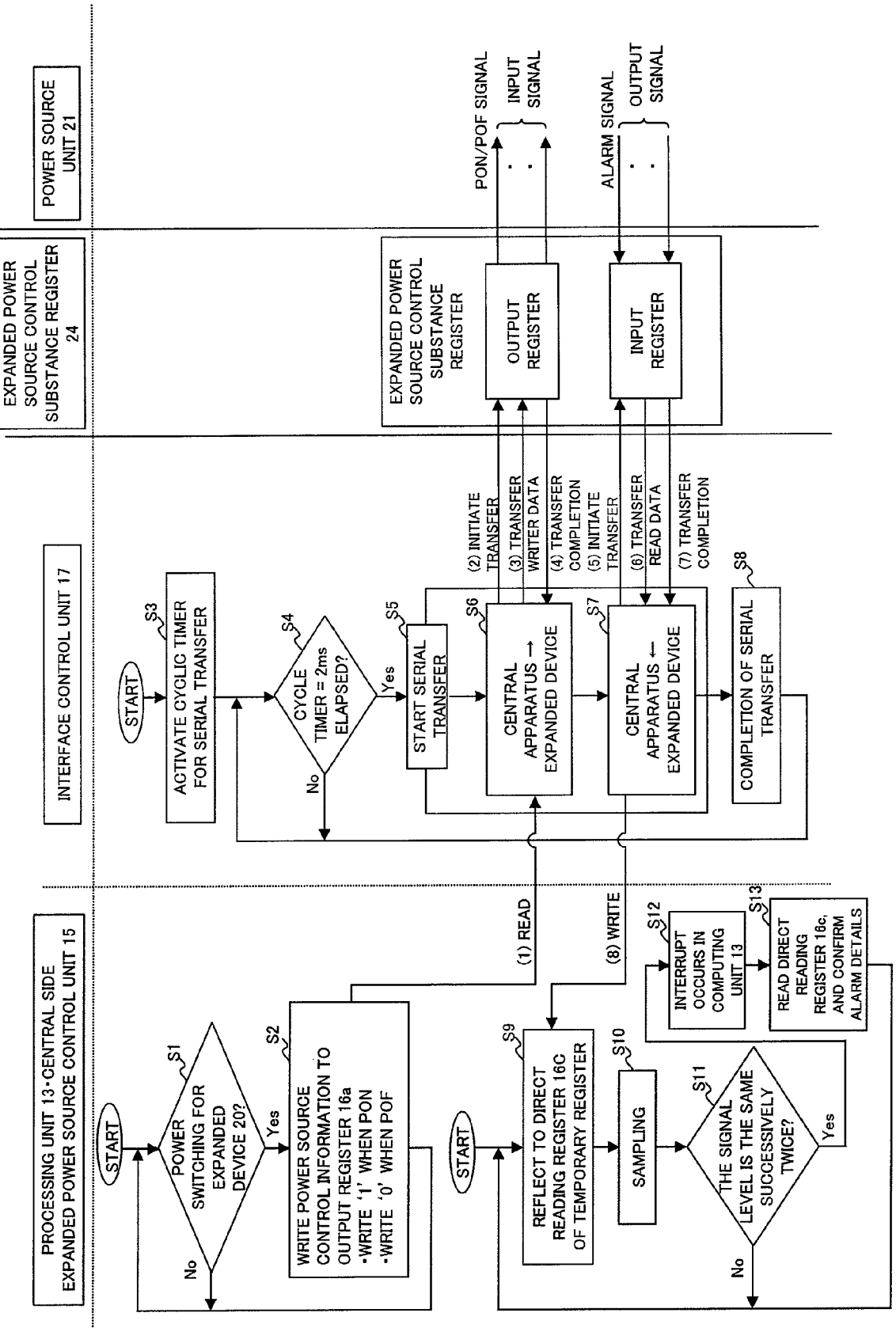
FIG. 6 is a flowchart for describing an operation procedures of a power source control system according to one preferred embodiment of the present invention.

Next, referring to the flowchart (step S1 through step S13) shown in FIG. 6, the operation procedures of the present power source control system 1 will be described.

A description will be made of power source control information write processing to the output register 16a by the computing unit 13 of the central power source control unit 12. First of all, the computing unit 13 evaluates whether or not a necessity for switching ON/OFF of the expanded device 20 occurs (step S1). If evaluated that the power source of the expanded device 20 need to be switched ON/OFF (YES route of step S1), the computing unit 13 writes power source control information for controlling the power source unit 21 to the output register 16a of the expanded power source control temporary register 16 of the central side expanded power source control unit 15 (step S2).

More specifically, when power source is to be ON, the computing unit 13 writes "1" into the power on bit (PON bit)

of the output register 16a, and when power source is to be OFF, the computing unit 13 writes "0". Here, as a matter of course, if the computing unit 13 does not determine that switching of the power source of the expanded power source is necessary (No route of step S1), the above processing of step S2 is not performed.

Then, after completion of writing processing of power source control information to the output register 16a (that is, upon reception of DATA-ACKNOWLEDGE signal from the central side expanded power source control unit 15) the computing unit 13 performs another processing.

Independent from the processing (the above steps S1 and S2) of the computing unit 13, the interface control unit 17 of the central side expanded power source control unit 15 performs data transfer processing of step S3 through S8 for updating the output register 24a or direct reading register 16c so that the content of the expanded power source control temporary register 16 becomes the same as the content of the expanded power source control substance register 24.

More precisely, the interface control unit 17 activates cycle timer for serial transfer (step S3). When the cycle timer elapses 2 ms (Yes route of step S4), the the interface control unit 17 starts data transfer processing under a serial transfer method (step S5; in the drawing, described as "start serial transfer". In this instance, the interface control unit 17 does not move to processing of the above step S5, until the cycle timer becomes 2 ms (No route of step S4).

Then, on the data transfer processing step of the above step S5, the interface control unit 17 transmits power source control information [see arrow (1) in the drawing] written in the output register 16a on the above step S2, from the central side expanded power source control unit 15 (central apparatus 10) to the expanded power source control unit 22 (expanded device 20) (step S6).

More precisely, as shown in FIG. 3, after transmitting a transfer start command to the interface control unit 23 [see arrow (2) in the drawing], the interface control unit 17 transmits power source control information [write data transfer; see arrow (3) in the drawing], and receives a transfer completion response from the interface control unit 23 (here, expanded power source control substance register 24) [see arrow (4) in the drawing], and data transfer from the central apparatus 10 to the expanded device 20 is completed.

In this instance, the expanded power source control unit 22 transmits, as an input signal, a signal (described as "PON/POF signal) for performing ON/OFF of power to the power source unit 21 based on the value (power source control information) written in the output register 24a. In response to the input signal, the power source unit 21 performs ON/OFF of power of the expanded device 20.

If power source abnormality occurs in the power source unit 21, the power source unit 21 transmits an alarm signal to the expanded power source control substance register 24 as an output signal, and this alarm information is held in the input register 24b.

When processing on the above step S6 is completed, the interface control unit 17 performs transmission processing of alarm information from the expanded power source control unit 22 (expanded device 20) to the central side expanded power source control unit 15 (central apparatus 10) (step S7).

More precisely, as shown in FIG. 5, after the interface control unit 17 transmits a transfer start command to the interface control unit 23 [see arrow (5) in the drawing], the interface control unit 23 transmits alarm information held in the input register 24b to the interface control unit 17 as read data [see arrow (6) in the drawing]. Then, the interface control unit 17 receives a transfer completion response from the interface control unit 23 [see arrow (7) in the drawing], and data transfer from the expanded device 20 to the central apparatus 10 is completed.

After completion of processing of the above steps S6 and S7, the interface control unit 17 ends data transfer processing (step S8; described as "completion of serial transfer" in the drawing), and returns to the processing of the above step S4.

Next, a description will be made of processing on the basis of the reading register 16b of the central side expanded power source control unit 15 and the computing unit 13.

When the processing of the above step S7 is performed, the alarm information of the power source unit 21 being thereby reflected to the direct reading register 16c of the reading register 16b of the expanded power source control temporary register 16 [see arrow (8) in the drawing; step S9], the central side expanded power source control unit 15 performs sampling of alarm information from the direct reading register 16c at predetermined cycles (here, 32 ms) (step S10).

Then, it is evaluated whether or not the signal level is successively the same for the sampling cycles (here, twice) set in the sampling cycle register 16g (that is, whether or not alarm information is held in the direct reading register 16c) (step S11).

Here, if the signal level is not successively the same (No route of step S11), the procedure returns to the processing of the above-described step S9. If the signal level is successively the same (Yes route of step S11), the central side expanded power source control unit 15 generates an interrupt to the computing unit 13 (that is, outputs an interrupt signal; step S12).

Then, when receiving an interrupt signal from the central side expanded power source control unit 15, the computing unit 13 reads the reading register 16b to check the details of the alarm. On the basis of the details of the alarm, the computing unit 13 computes power source control content of the power source unit 21 (step S13), and the procedure returns to step S9.

In this instance, processing (the above-described step S9 through S12) of outputting an interrupt signal by the central side expanded power source control unit 15 is performed independently from the processing of the computing unit 13.

According to the power source control system 1 as one preferred embodiment of the present invention, the central power source control unit 12 has an expanded power source control temporary register 16 (more specifically, the output register 16a), which temporarily holds power source control information of the power source unit 21 of the expanded device 20, and the interface control unit 17 which sends the power source control information held in the temporary register 16 to the expanded power source control unit 22. Thus, the computing unit 13 no longer needs to write power source control information to the expanded power source control unit 22 by way of a bus, like the previous art. As a result, time for write processing is significantly reduced, and the computing unit 13 can perform the next processing immediately, so that processing performance is improved.

Further, the interface control unit 17 employs the serial data bus scheme, and sequentially transmits power source control information to the expanded power source control unit 22 by use of a single data signal line 34, so that the number of signal lines is significantly decreased in comparison with the previous art in which parallel data bus scheme is employed.

Furthermore, the interface control unit 17 of the central power source control unit 12 receives alarm information of the power source unit 21 from the interface control unit 23 of the expanded power source control unit 22, and the received alarm information is held in the reading register 16b (more specifically, direct reading register 16c) of the temporary register 16. Thus, the computing unit 13 no longer needs to read alarm information of the power source unit 21 in the expanded power source control unit 22 by way of the bus. Thus time for read processing of alarm information is significantly reduced, so that the processing performance of the computing unit 13 is improved.

On the other hand, the expanded power source control unit 22 has an interface control unit 23 which receives power source control information sent from the interface control unit 17, and also an expanded power source control substance register 24 (more specifically, output register 24a) which holds the received power source control information. Hence, it is surely possible to perform power source control of the power source unit 21 based on the power source control information computed by the computing unit 13.

Further, the expanded power source control unit 22 has an input register 24b for holding alarm information from the power source unit 21, and the interface control unit 23 transmits the alarm information held in the input register 24b to the interface control unit 17. Thus, alarm information which is transmitted from the power source unit 21 at the time of abnormality occurs in the power source unit 21, can be sent to the computing unit 13 with reliability. As a result, it is possible to reflect the alarm information to power source control of the power source unit 21.

That is, since the computing unit 13 computes power source control information of the power source unit 21 on the basis of the alarm information which is received by the interface control unit 17 and held in the direct reading register 16c, it is possible to reflect the alarm information to power source control of the power source unit 21 with reliability.

In addition, the interface control unit 17 transmits power source control information to the interface control unit 23, independently from the computation processing by the computing unit 13. In addition, after the computing unit 13 performs write processing of the power source control information to the output register 16a, the central side expanded power source control unit 15 immediately transmits a DATA-ACKNOWLEDGE signal to the computing unit 13, regardless of transmission processing by the interface control unit 17, so that the computing unit 13 can immediately perform the next computation processing, and the processing performance is improved.

Further, the interface control unit 17 regularly performs writing processing (transfer processing) of power source control information by the output register 16a to the output register 24a, and reading processing (transfer processing) by the input register 24b to the direct reading register 16c. Thus, power source control information held in the output register 16a is reflected to the output register 24a with reliability, and the alarm information held in the input register 24b is surely reflected to the direct reading register 16c. As a result, it is possible to perform power source control of the power source unit 21 with reliability.

In addition, when the central side expanded power source control unit 15 detects that alarm information is held in the direct reading register 16c and an alarm signal is output from the power source unit 21, it outputs an interrupt signal to the computing unit 13. Hence, the computing unit 13 can perform computation with reliability on the basis of the alarm information in response to the interrupt signal.

[2] Other Modifications

In this instance, the present invention should by no means be limited to the above-illustrated embodiment, and various changes or modifications may be suggested without departing from the gist of the invention.

Figure 7:
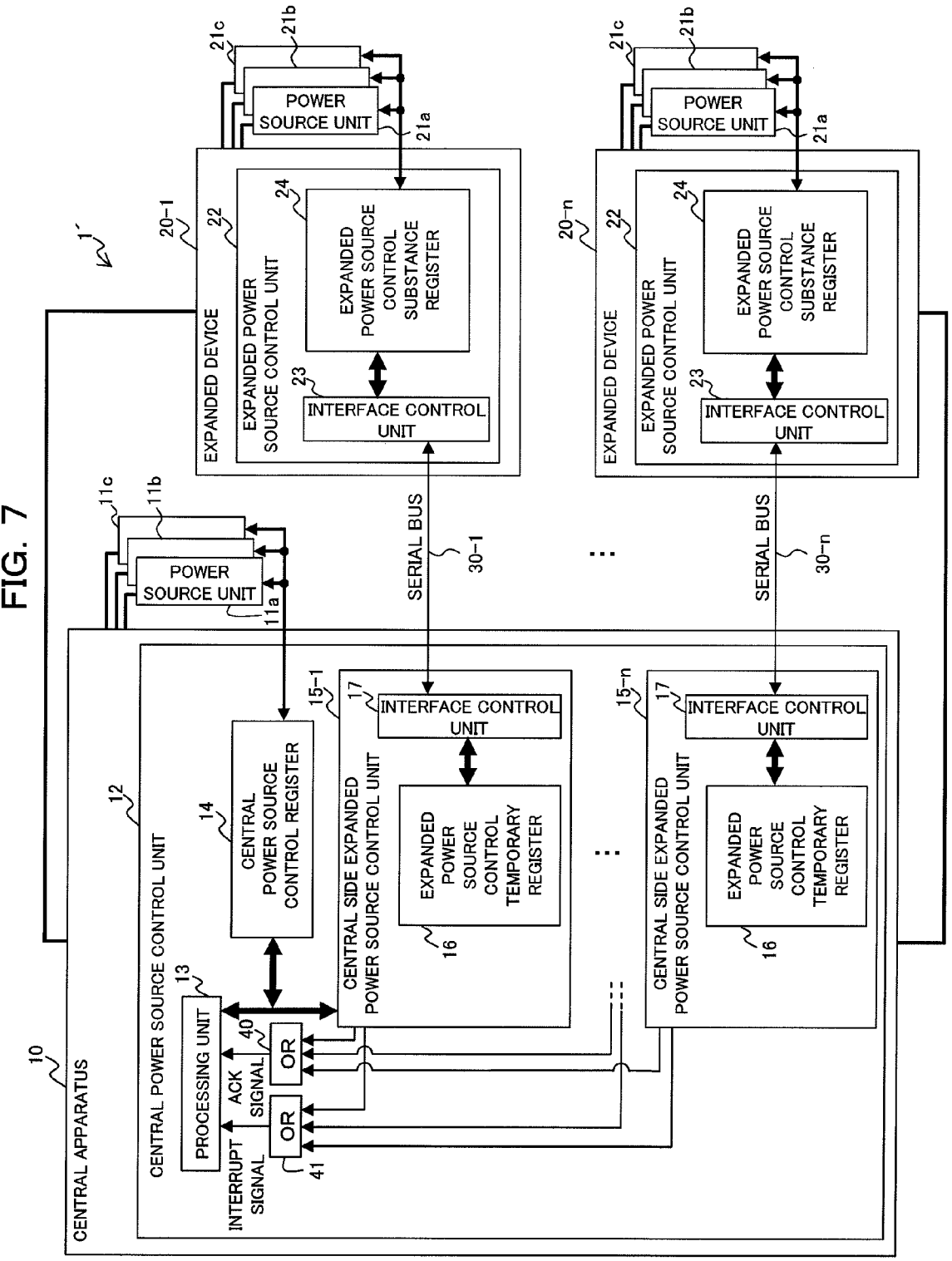
FIG. 7 is a block diagram showing a construction of a power source control system as a modified example of the present invention.

For example, in the above-described embodiment, only one expanded device 20 is connected to the central apparatus 10. The present invention should by no means be limited to this, and as shown in FIG. 7, multiple (here, n-number of; n is an integer greater than 1) expanded devices 20-1 through 20-n can be connected to the central apparatus 10. In this case, the central power source control unit 12 of the power source control system 1' has multiple central side expanded power source control units 15-1 through 15-n (expanded power source control temporary register 16 and interface control unit 17) corresponding to multiple expanded power source control units 22, and the interface control units 17 and 23 are connected through serial buses 30-1 through 30-n, respectively.

Then, each of the central side expanded power source control units 15-1 through 15-n performs processing independently. The central power source control unit 12 further includes an OR circuit 40, which implements the logical OR operation of DATA-ACKNOWLEDGE signals output from the multiple central side expanded power source control units 15-1 through 15-n, and an OR circuit 41 which implements the logic OR operation of interrupt signals output from the multiple central side expanded power source control unit 15-1 through 15-n.

With this arrangement, even when multiple expanded devices 20 are connected to the central apparatus 10, the central power source control unit 12 can perform power source control of each expanded device 20 (power source unit 21), and similar effects to those described in the above-described embodiment are obtained. In this instance, in FIG. 7, the inside of the central power source control register 14, the expanded power source control temporary register 16, and the expanded power source control substance register 24 is not illustrated for the purpose of simplifying, but they have the same constructions as those of FIG. 1.

Figure 8:
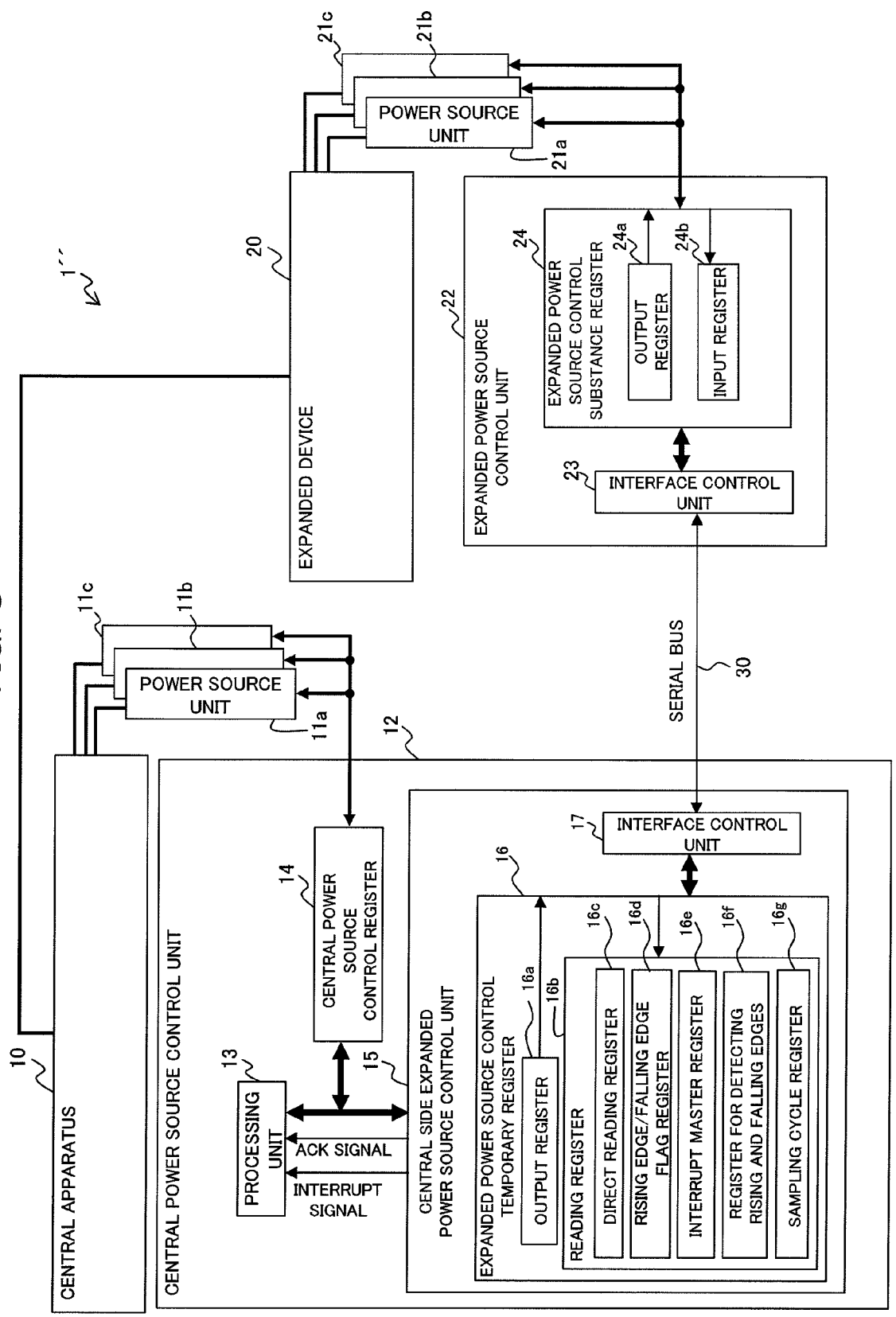
FIG. 8 is a block diagram showing a construction of a power source control system as a modified example of the present invention.

Further, according to the above embodiment, the central power source control unit 12 is constructed as a part of the central apparatus 10, and the expanded power source control unit 22 is constructed as a part of the expanded device 20. The present invention should by no means be limited to this. For example, as shown in the power source control system 1" of FIG. 8, the central apparatus 10 and the central power source control unit 12, and the expanded device 20 and the expanded power source control unit 22 can be provided as different devices (different cabinet), respectively.

Furthermore, in the above-described embodiment, although three power source units 11, 21 are connected to the central apparatus 10 and the expanded device 20, the number of power units 11 and 21 should not be limited.

In this instance, in the above-described embodiment, the interface control units 17 and 23 form a serial bus interface, which are connected by the serial bus 30. The present invention should by no means be limited to this, and for example, the interface control units 17 and 23 can form an interface in which data transfer is performed by the parallel transfer scheme, and the interface control units 17 and 23 can be connected with a parallel bus.

Further, in the above-described embodiment, data transfer between the interface control units 17 and 23 is controlled by the interface control unit 17. The present invention should by no means be limited to this, and the interface control unit 23 can control data transfer between the interface control units 17 and 23.

What is claimed is:

1. A power source control circuit, comprising:
a power source control information storage unit holding power source control information written by a central processing circuit for controlling power source of another power source device;

a transmission control unit transmitting the power source control information held in said power source control information storage unit to another power source control circuit that performs power source control of said another power source device;

a reception control unit receiving power source information relating to said another power source device from said another power source control circuit; and a power source information storage unit holding the power source information received by said reception control unit.

2. A power source control circuit as set forth in claim 1, wherein said transmission control unit sequentially transmitting the power source control information using at least one signal line.

3. A power source control circuit, comprising:

a reception control unit receiving power source control information for power source control of a power source device, which information is held in a central power source control circuit, from the central power source control circuit;

a power source control information storage unit holding the power source control information received by said reception control unit;

a power source information storage unit holding power source information relating to the power source device; and a transmission control unit transmitting the power source information held in said power source information storage unit to the central power source control circuit and storing the power source information in the central power source control circuit.

4. A power source control circuit as set forth in claim 3, wherein said transmission control unit sequentially transmitting the power source control information using at least one signal line.

5. A power source control device, comprising:

a processing unit operating first power source control information for performing power source control of a first power source device of another device connected to a central device;

a first power source control information storage unit holding the first power source control information operated by said processing unit;

a transmission control unit transmitting the first power source control information held in said first power source control information storage unit to said another device;

a reception control unit receiving power source information relating to the first power source unit from said another device; and a power source information storage unit holding the power source information received by said reception control unit.

6. A power source control device as set forth in claim 5, wherein said transmission control unit sequentially transmitting the power source control information using at least one signal line.

7. A power source control device as set forth in claim 5, wherein said processing unit operating second power source control information for controlling power source in a second power source device which supplies electric power to the central device, and wherein said power source control device further comprises a second power source information storage unit holding the second power source control information computed by said processing unit.

8. A power source control system, comprising:

an expanded power source control device controlling power source of a first power source device that supplies electric power to another device connected to a central device; and a central power source control device including a processing unit operating first power source control information for controlling power source of the first power source device, a first power source control information storage unit holding the first power source control information operated by the processing unit and a first transmission control unit transmitting the first power source control information held in the first power source control information storage unit to said expanded power source control device, wherein the expanded power source control device comprises:

a second transmission control unit transmitting power source information relating to the first power source device transmitted from the first power source device and held in expanded power source control device to said central power source control device, wherein the central power source control device comprises:

a second reception control unit receiving the power source information transmitted from the second transmission control unit; and a second power source information storage unit holding the power source information received by the second reception control unit.

9. A power source control system as set forth in claim 8, wherein said expended power source control device comprising:

a first reception control unit receiving the first power source control information transmitted from the first transmission control unit; and a second power source control information storage unit holding the first power source control information received by the first reception control unit.

10. A power source control system as set forth in claim 9, wherein the first transmission control unit sequentially transmitting the first power source control information to the first reception control unit using at least one signal line.

11. A power source control system as set forth in claim 8, wherein said expanded power source control unit comprising:

a first power source information storage unit holding power source information relating to the first power source device transmitted from the first power source device, wherein the second transmission control unit transmitting the power source information held in the first power source information storage unit to said central power source control device.

12. A power source control system as set forth in claim 11, wherein the processing unit operating the first power source control information on the basis of the power source information held in the second power source information storage unit.

13. A power source control system as set forth in claim 8, wherein the processing unit operating second power source control information for controlling power source of a second power source device which supplies electric power to the central device.

14. A power source control system as set forth in claim 13, wherein said central power source control device including a third power source control information storage unit holding the second power source control information operated by the unit.

15. A power source control system as set forth in claim 8, wherein the second transmission control unit sequentially transmitting the power source control information to the second reception control unit using at least one signal line.

16. A power source control system as set forth in claim 8,
wherein a plurality of ones of said another device are connected to the central device,
wherein said another device comprising a plurality of ones of said expanded power source control device, corresponding to a plurality of first power source devices relating to a plurality ones of said another device, and
wherein the central power source control device comprising a plurality of ones of the first power control information storage unit and a plurality of ones of the first transmission control unit corresponding to a plurality of ones of the expanded power source control device.

17. An information processing apparatus whose power source is controlled by a power source control apparatus, said power source control apparatus comprising:
a processing unit operating first power source control information for controlling power source of a first power source device of another device connected to a central device;
a first power source control information storages unit holdings the first power source control information operated by the processing unit;
a transmission control unit transmitting the first power source control information held in the first power source control information storage unit to said another device;
a reception control unit receiving power source information relating to the first power source unit from said another device; and
a power source information storage unit holding the power source information received by said reception control unit.

18. A power source control system, comprising:
an expanded power source control device controlling power source of a first power source device that supplies electric power to another device connected to a central device; and
a central power source control device including a processing unit operating first power source control information for controlling power source of the first power source device, a first power source control information storage unit holding the first power source control information operated by the processing unit and a first transmission control unit transmitting the first power source control information held in the first power source control information storage unit to said expanded power source control device,
wherein a plurality of ones of said another device are connected to the central device,
wherein said another device comprising a plurality of ones of said expanded power source control device, corresponding to a plurality of first power source devices relating to a plurality ones of said another device, and
wherein the central power source control device comprising a plurality of ones of the first power control information storage unit and a plurality of ones of the first transmission control unit corresponding to a plurality of ones of the expanded power source control device.

* * * * *